Aug. 15, 1933.  P. E. MERCIER  1,922,489
MEANS FOR THE SEPARATION AND CONCENTRATION OF THE CONSTITUENTS
OF HETEROGENEOUS EMULSIONS, OR SUSPENSIONS
Filed Oct. 9, 1930    2 Sheets-Sheet 1
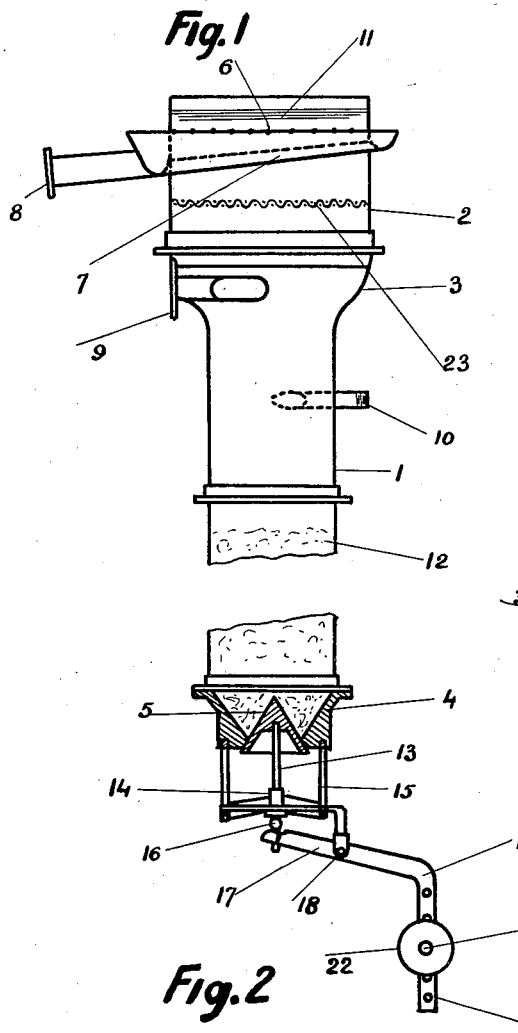
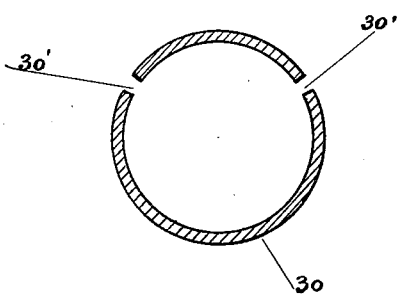
Inventor:-
Pierre Ernest Mercier
by
Langner, Parry, Card & Langner
Attys.

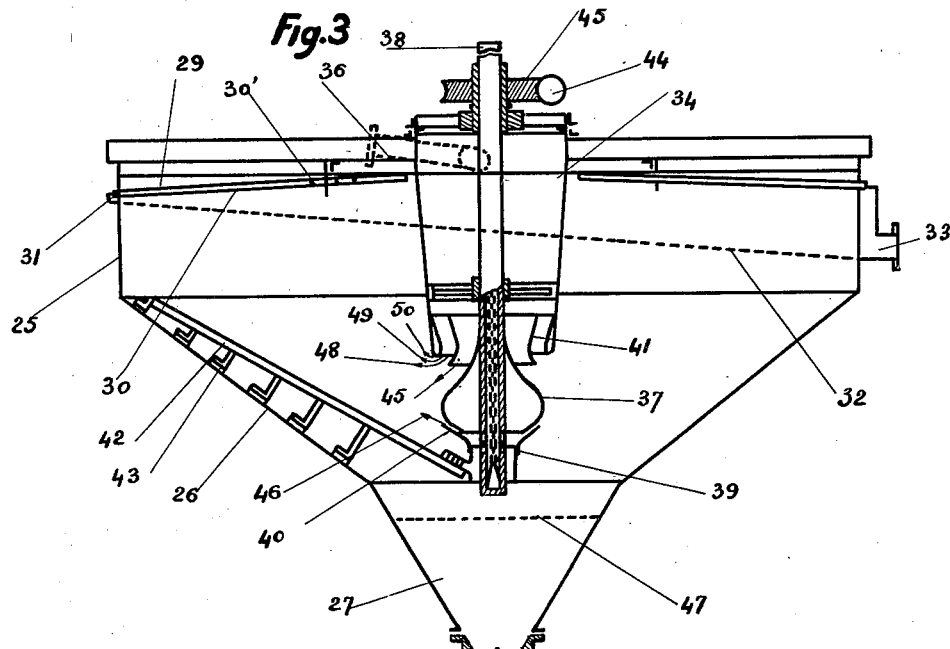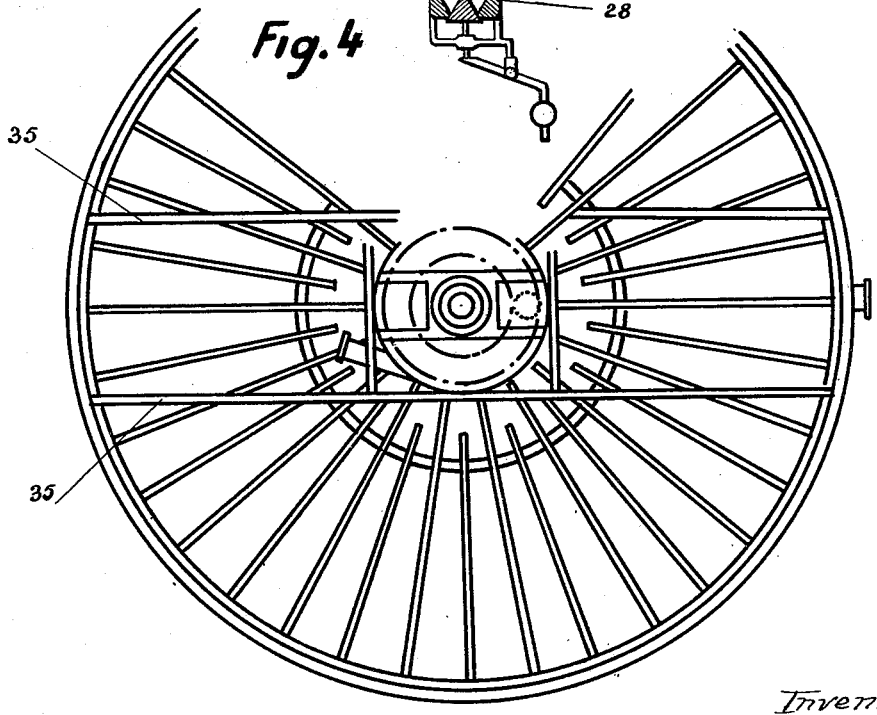

Patented Aug. 15, 1933

1,922,489

UNITED STATES PATENT OFFICE 1,922,489

MEANS FOR THE SEPARATION AND CONCENTRATION OF THE CONSTITUENTS OF HETEROGENEOUS EMULSIONS, OR SUSPENSIONS

Pierre Ernest Mercier, Neuilly sur Seine, France, assignor to Compagnie Industrielle Franco-Africaine, Alger Parc, Gatlif, Algeria, a Company of France Application October 9, 1930, Serial No. 487,626, and in France October 12, 1929

2 Claims. (Cl. 209—160)

The object of the present invention is to provide means for separating the constituents of heterogeneous suspensions or emulsions particularly of china clays and for concentrating the separate suspensions so obtained.

The separation of the constituents of a heterogeneous suspension has previously been effected by making use of the different times of deposit of the different constituents. For example china clay suspensions were purified by causing the suspensions to traverse channels of such length that the heavier particles had time to settle to the bottom whilst the other constituents were carried along by the water to the outlet of the channel.

According to the present invention a process of vertical levigation is employed. The suspension or emulsion is caused to rise vertically in a stream the velocity of which is regulated so as to be uniform throughout and so as to be intermediate the velocities of fall of the particles to be separated at the particular concentration at which the operation is being carried out. Owing to this uniform ascending velocity of flow of the stream, the finer particles, that is to say those the velocity of fall of which is less than that of the current remain with the liquid and are removed with it at the discharge outlets. The refuse and heavier particles, however, sink towards the bottom with a velocity equal to the difference between their velocity of fall and the rising velocity of the stream. They therefore separate from the stream and collect in an undisturbed zone at the base of the apparatus from which they are removed by suitable means.

In order to obtain a uniform ascending velocity throughout the whole of the stream, discharge openings are arranged considerably below the free level of liquid (15 to 20 cms for example) distributed evenly over the area of discharge (for example holes at the periphery in the case of apparatus of small diameter employing high velocities of upward stream, say several centimetres, per second, or radial perforated tubes in the case of apparatus of large diameter and employing small velocities, say about $\frac{1}{10}$ mm per second, thus ensuring uniform discharge).

In order to enable the suspension which continuously reaches a point about half-way up the apparatus with the desired direction and speed, to form the uniformly rising current under the action of the discharge, and to prevent undesired separation of the particles at the commencement of the upward path, before the stream lines of the suspension have attained their correct vertically rising velocity, pure water is introduced at a point below the point of admission of the suspension so that the stream of emulsion when admitted to the apparatus meets a regular ascending stream of pure water which thus ensures that the suspension rapidly assumes its correct upward velocity, and which entrains the finer particles and carries them towards the top of the apparatus. These finer particles would otherwise tend to sink to the bottom at the commencement of the upward path of the suspension.

The present invention provides inter alia apparatus including a sand remover and a separator of the finer particles in which the principles of this invention are applied to very great advantage.

The sand remover having peripheral discharge apertures is formed from two cylinders of unequal size, the larger one being above the other and the two being connected by a uniting surface. The suspension or emulsion is admitted tangentially in to the uniting zone and the pure water is admitted tangentially lower down in the smaller cylinder. Under the action of the discharge the pure water acquires a uniform upward motion throughout the entire cross section of the small cylinder. The suspension which is admitted into the enlarging or diverging zone readily mixes with the pure water and rapidly takes up its full upward velocity.

The separator of the finer particles having radiating discharge tubes is a cylindrical receptacle having a widely splayed conical base provided with a trough having steep sides. The suspension is admitted tangentially into a large central tube, the lower opening of which is provided with a circular dividing partition. Opposite this opening is a suitably shaped valve element the position of which controls the cross section of the opening for the passage of liquid and directs the stream of suspension or emulsion. The valve member is supported by a tube which serves for the introduction of pure water which is directed into the receptacle by a circular lip disposed below the enlarged portion of the valve member. This tube through which the water is admitted is rotatable and carries an arm provided with raking members which cause the refuse and large particles deposited on the large cone to fall into the trough. The apertures in the discharge tubes are preferably arranged along generating lines of the tubes at the extremities of radii inclined at 45° to the vertical so as to avoid the accumulation of deposits at these holes and consequent choking thereof.

Each of these apparatus is provided with a valve which is automatically controlled for removal of the refuse or deposit. This is effected by means of a counter weight rod, bent at very nearly a right angle. The present invention comprehends the application of the same principles for the concentration of a suspension. For example after the china clay suspension has been completely purified, it contains the very finest particles only and it is very dilute. The concentration is effected in a vertical levigation apparatus employing a vertically ascending velocity of the liquid which is regulated to a value lower than the velocity of fall of the finest particles in the suspension. Therefore pure water only will issue from the discharge openings. Thus large quantities of liquid can be rapidly and efficiently concentrated with apparatus of relatively small dimensions.

By way of example, a sand remover and a separator of the finer particles will be described below with reference to the accompanying drawings in which:

Figures 1 and 2 show the sand remover in sectional elevation and in plan.

Figures 3 and 4 are similar views of the separator for the finer particles.

Figure 5 is a section of a discharge tube provided with discharge orifices.

The sand remover illustrated in Figures 1 and 2 consists essentially of a lower cylinder 1 and an upper cylinder 2 of larger diameter the two cylinders being joined by a truncated cone 3. The lower cylinder 1 is provided with a conical base 4 closed by an automatic conical valve 5. The upper cylinder 2 is provided near the top with a number of regularly spaced discharge holes 6. Around the cylinder 2 at the level of the holes 6 is an inclined discharge channel 7 leading to a discharge pipe 8. A horizontal pipe 9 opens tangentially into the uniting zone 3 of the two cylinders 1 and 2 for the purpose of admitting the suspension or emulsion, at a relatively low speed for example 10 cms per second. Lower down a horizontal pipe 10 enters the lower cylinder tangentially and serves for the admission of pure wash water at a greater speed for example 50 cms per second.

The method of operation of the sand remover is as follows:

The discharge of suspension or emulsion and of the water are regulated, having regard to the dimensions of the apparatus so that the liquid level is established in the part 11 considerably above the ring of discharge openings 6, for example 15 to 20 cms above it. The discharge takes place therefore under a head which is practically independent of the suspension or the water or the removal of sediment.

The water admitted at 10 takes up a regular ascending motion. On account of this discharge and of the enlargement 3 the suspension admitted by the pipe 9 although denser than the pure water cannot sink below the level of the pipe 9. It mixes intimately with the water and the mixture takes up a uniform upward velocity towards the discharge openings 6 less of course than that of the water in the cylinder 1. At the outlet of the pipe 9 the stream of suspension has practically no upward velocity. The heavy particles (sand) sink immediately in the pure water, the upward velocity of which (1 cm per sec. for example) has been regulated so as to be less than the velocity of fall of the sand (2 or more cms per sec.) whilst it is greater than that of the lighter particles which remain in the mixture of suspension and water and are discharged at the holes 6. The sand collects in the bottom of the cylinder 1 where it forms a deposit 12 of a certain depth. The valve 5 is carried by a rod 13 passing through a guide 14 supported by columns 15 mounted on the base of the cylinder 1. The rod 13 carries at its lower end a roller 16 bearing against the end of a lever 17 pivoted at 18. This lever is bent sharply at 19 and continues as an arm 20 provided with holes 21 for securing a counterweight 22 thereto. This is so regulated that the counterweight substantially balances the force exerted on the valve 5. As soon as the depth of the deposit of sand 12 passes a certain value, the valve 5 is depressed. The moment of the counterweight increases, whilst the force due to the sand on the valve decreases, so that as soon as a small amount of sand has been discharged the valve closes again. Thus the valve operates intermittently at regular intervals and owing to the considerable depth of the cylinder 1 and of the mass of sand 12 this operation is practically without effect on the velocity of the ascending fluid mass above the inlet pipe 9 for the suspension.

A metal gauze screen 23, the meshes of which are naturally sufficiently large to admit the passage of the light particles, may be arranged a little below the holes 6 for the purpose of rendering uniform the velocity of the ascending liquid stream.

The separator for the fine particles is shown in Figures 3 and 4. These fine particles (clays, micas, fine silica) which it is desired to separate amongst themselves have a velocity of fall of the order of a friction of a millimetre per second. It is less the greater the concentration i. e. the density of the suspension. It is therefore desirable to work in very dilute suspensions, that is to say with very large quantities of liquids, to which a regular upward velocity of the order of $\frac{1}{10}$ mm per second should be applied. This result can only be attained by the use of special apparatus.

The separator consists essentially of a large cylinder 25 having a conical base 26 of very wide splay, provided with a trough 27 having an automatic valve 28. Below the free level 29, are radial tubes 30 provided with apertures 30' and closed at their inner ends and opening at their outer ends into a peripheral channel 31 surrounding the cylinder 25 having an inclined floor and opening into a discharge pipe 33. The tubes 30 are slightly inclined towards the outside. The length and arrangement of these tubes as well as the distribution of the holes in them are such as to ensure that the discharge per unit area of surface is sensibly constant at the discharge level. The holes 30' (Figure 5) are preferably arranged along generating lines of the tubes at the extremities of radii inclined at 45° to the vertical that is to say in the upper inclined surface of the tubes so that any deposits which might be formed at these holes tend to slip off the inclined surfaces under the influence of gravity.

Disposed centrally in the apparatus is a tube 34 of relatively large diameter, for the admission of the suspension. It is supported by two cross members 35 secured to the edge of the cylinder 25. The suspension is introduced tangentially through a substantially horizontal tube 36. The lower open end of the tube 34 is partially masked or obstructed by an enlarged portion 37 supported by a tube 38. Pure water is admitted to the tube 38 and emerges therefrom through orifices 39 in the tube. It is directed by a circular lip 40 and by the under surface of the enlarged portion 37. The tube 34 for admitting the suspension is provided with a circular partition 41 which on account of the turbulent or gyratory movement of the suspension entering the tubes 36 effects a preliminary separation, the heavy particles being in the centre and the lighter ones at the periphery. The tube 38 carries at its lower end an arm 42 provided with rakes 43 resting on the conical bottom 26. The tube 38 is rotated by means of a worm 44 engaging with a worm wheel 45 fixed to the tube.

The mode of operation of this separator for the finer particles is as follows:

The gyrating particles of the suspension which enter the tube 36 undergo a rough preliminary separation by reason of the partition 41. The heavier particles flow over the upper surface of the enlarged portion 37 following the arrow 45, crossing the annular jet of pure water 46, and collecting at 47 in the trough 27. The remainder of the suspension follows stream lines such as 48, 49, 50. Under the influence of the uniformly distributed discharge orifices 31' the whole mass of liquid within the cylinder 45 acquires a very slow uniform upward velocity. If the apparatus is well regulated the lighter particles rise and are discharged with the liquid through the tubes 30 whilst the heavier particles sink to the oblique conical bottom 26 from which they are forced by the rake 42 into the trough 27. The removal of the sediment by means of the valve 28 takes place in a similar manner to that described with reference to Figures 1 and 2. The apparatus described above may be advantageously employed for the preparation of china clays from the clay from the quarries. The suspended raw material is first levigated in a sand removing apparatus, and then in a series of separating apparatus of increasing diameters. Thus the different constituents can be separated in degrees of increasing fineness.

Similarly separators of the same type may be employed for concentrating each of the suspensions or emulsions which each contain a single constituent. In order to effect this concentration it is only necessary to impart to the liquid mass an upward velocity less than the velocity of descent of the particles contained in the liquid. All the particles sink to the bottom of the apparatus and pure water emerges from the discharge outlets.

I claim:

1. An apparatus for separating the constituents of heterogeneous suspensions comprising a container, a passage for introducing the suspension arranged at substantially the center of the container emptying toward the bottom of said container, discharge means for the lightest components and liquid in the upper part of said container, comprising means having perforations for the discharge of the liquid arranged substantially in a horizontal plane appreciably below the level of the liquid and distributed in such manner that in this plane the quantities of liquid passing off per unit of surface in the discharge plane are the same and said container being extended above the discharge and adapted to maintain a free liquid level substantially above said discharge means.

2. Apparatus for separating the constituents of heterogeneous suspensions comprising a container, a passage for introducing the suspension arranged at substantially the center of said container emptying downwardly, discharge means for the lightest components and the liquid in the upper part of said container along radii thereof having lateral perforations for the entrance of the liquid, said perforations being located substantially in the same horizontal plane and appreciably below the free level of the liquid and being distributed so that the quantities of liquid which pass off per unit of surface of the discharge plane are the same and said container being extended above the discharge and adapted to maintain a free liquid level substantially above said discharge means.

PIERRE ERNEST MERCIER.